(12) United States Patent
AI (10) Patent No.: US 8,797,939 B2
(45) Date of Patent: Aug. 5, 2014

(54) MULTIMEDIA BROADCAST MULTICAST SERVICE SCHEDULING AND TRANSMISSION METHOD AND SYSTEM

(75) Inventor: Jianxun AI, Shenzhen (CN)

(73) Assignee: ZTE Corporation, Shenzhen, Guangdong (CN)

( * ) Notice: Subject to any disclaimer, the term of this patent is extended or adjusted under 35 U.S.C. 154(b) by 186 days.

(21) Appl. No.: 13/502,163

(22) PCT Filed: Jun. 29, 2010

(86) PCT No.: PCT/CN2010/074753
§ 371 (c)(1),
(2), (4) Date: Apr. 16, 2012

(87) PCT Pub. No.: WO2011/020384
PCT Pub. Date: Feb. 24, 2011

(65) Prior Publication Data
US 2012/0243458 A1 Sep. 27, 2012

(30) Foreign Application Priority Data

Aug. 18, 2009 (CN) .......................... 2009 1 0168549

(51) Int. Cl.
*H04H 20/71* (2008.01)
*H04W 72/00* (2009.01)

(52) U.S. Cl.
CPC .................................. *H04W 72/005* (2013.01)
USPC ........................................................ 370/312

(58) Field of Classification Search
USPC ................. 370/252, 312, 338, 315, 329, 432; 455/452.1
See application file for complete search history.

(56) References Cited

U.S. PATENT DOCUMENTS

| 2009/0147717 A1* | 6/2009 | Cai .............................. 370/312 |
| 2010/0113056 A1 | 5/2010 | Chen et al. |

(Continued)

FOREIGN PATENT DOCUMENTS

| CN | 101272518 A | 9/2008 |
| CN | 101296102 A | 10/2008 |

(Continued)

OTHER PUBLICATIONS

3GPP TS 25.346 V8.3.0 Technical Specification, 3rd Generation Partnership Project;Technical Specification Group Radio Access Network;Introduction of the Multimedia Broadcast Multicast Service(MBMS) in the Radio Access Network (RAN); Stage 2 (Release 8), Mar. 2009, 71 Pages.*

(Continued)

*Primary Examiner* — Edan Orgad
*Assistant Examiner* — Ivan O Latorre
(74) *Attorney, Agent, or Firm* — Brooks Kushman P.C.

(57) ABSTRACT

A method for scheduling and transmitting a MBMS includes: for each multicast radio interface channel, a lower layer network element scheduling a MBMS born by the multicast radio interface channel according to a scheduling period of the multicast radio interface channel, wherein data of the MBMS are scheduled and scheduling information is generated in a Multicast/Broadcast over Single Frequency Network (MBSFN) subframe resource occupied by the multicast radio interface channel in a resource allocation period corresponding to the scheduling period; and said lower layer network element sending to a user equipment a signaling indicating resource allocation information and scheduling period information of each multicast radio interface channel, and sending the data of the MBMS and said scheduling information to the user equipment. A system is further provided for scheduling and transmitting a MBMS and a lower layer network element for supporting scheduling and transmitting a MBMS.

14 Claims, 2 Drawing Sheets

(56) References Cited

U.S. PATENT DOCUMENTS

| | | | |
|---|---|---|---|
| 2010/0195558 A1* | 8/2010 | Koskinen | 370/312 |
| 2010/0309836 A1 | 12/2010 | Sugawara et al. | |
| 2010/0315963 A1* | 12/2010 | Jading et al. | 370/252 |
| 2011/0013554 A1* | 1/2011 | Koskinen | 370/315 |
| 2011/0026522 A1* | 2/2011 | Hsu | 370/390 |
| 2011/0044223 A1* | 2/2011 | Kim et al. | 370/312 |

FOREIGN PATENT DOCUMENTS

| | | | | | |
|---|---|---|---|---|---|
| WO | WO 2008/113262 | * | 9/2008 | | H04W 4/06 |
| WO | WO 2009/078152 | * | 6/2009 | | H04W 4/06 |
| WO | WO2009092277 | * | 7/2009 | | H04L 12/56 |
| WO | 2009096305 A1 | | 8/2009 | | |

OTHER PUBLICATIONS

Nokia Siemens Networks, "MBSFN Scheduling and Content Synchrinization", 3GPP TSG-RAN WG3 Meeting #57bis, Oct. 2007, 10 Pages.*

International Search Report for PCT/CN2010/074753, English translation attached to original, Both completed by the Chinese Patent Office on Sep. 21, 2010, All together 8 Pages.

* cited by examiner

MULTIMEDIA BROADCAST MULTICAST SERVICE SCHEDULING AND TRANSMISSION METHOD AND SYSTEM

CROSS-REFERENCE TO RELATED APPLICATION

This application is the U.S. national phase of PCT Appln. No. PCT/CN2010/074753 filed Jun. 29, 2010 which claims priority to Chinese Application No. 200910168549.0 filed Aug. 18, 2009, the disclosures of which are incorporated in their entirety by reference herein.

TECHNICAL FIELD

The present invention relates to the Long Term Evolution (LTE) system, and in particular, to a method for scheduling and transmitting a scheduling period of a radio interface channel bearing a Multimedia Broadcast Multicast Service (MBMS).

BACKGROUND OF THE RELATED ART

In order to effectively use the mobile network resources, the 3rd Generation Partnership Project (3GPP) provides the MBMS service. The MBMS service is a technique of transmitting data from one data source to multiple destinations, which implements the share of the network (including the core network and the access network) resources, and improves the utilization ratio of the network resources (especially the air interface resources). The MBMS defined in the 3GPP is able to not only implement the pure text and low speed message classified multicast and broadcast, but also implement the broadcast and multicast of the high speed multimedia service, and provide various and rich video, audio and multimedia service, which complies with the trend of the future mobile data development and provides a better service prospect for the development of the 3G.

In the LTE, the MBMS service can use a way of the multicast mode, which is called as a Multicast/Broadcast over Single Frequency Network (MBSFN) transmitting mode. The MBMS service sent by the multicast mode is also called as the MBSFN service. The same coding after modulating format can be used in multiple cells. The same physical resource is used to send the same content. The features of the multi-cell transmission of MBMS include: 1) synchronization transmission in the MBSFN area; 2) supporting the multi-cell MBMS transmission combination; 3) the Multicast traffic Channel (MTCH) and the Multicast Control Channel (MCCH) are mapped into the MCH transport channel in the Point to Multi-point (p-T-m) mode; 4) the MBSFN synchronization area, the MBSFN area, MBSFN transmission, the advertisement and the reserved cell are all semi-statically configured by the operation and maintenance. Thus, the User Equipment (UE) of multiple cells can receive multiple MBMS data with the same content and perform the Single Frequency Network (SFN) combination, thereby being able to improve the gain of the received signal.

Multiple cells using the same physical resource and using the MBSFN transmission mode to send the same MBMS service compose one MBSFN area. In the practical LTE networking, several MBSFN services exist in one MBSFN area, and all these MBSFN services belonging to the same MBSFN area are called as one MBSFN service group, and that is to say, one MBSFN service group only belongs to one MBSFN area. One MBSFN area includes multiple cells, and each cell is configured with one completely same MBSFN service group. The MTCH, scheduling information and the corresponding MCCH of multiple MBSFN services in the same MBSFN area can be multiplexed into one Multicast Channel (MCH). The MCCH and MTCH are logical channels, and the MCH is a transport channel.

In the related art, the MCH is mapped into the Physical Multicast Channel (PMCH) of the physical channel, and the MCH and the PMCH are the one-to-one mapping.

The related art introduces the MBSFN Subframe Allocation Pattern occasion (MSAP occasion) used for indicating the multicast subframe resources occupied by the MTC in a period. One MCH channel allocates one or more MBSFN subframe in one or more MBSFN frames through the MSAP. The MBSFN subframe refers to the subframe sent by the multicast mode, and the MBSFN frame refers to the frame including the MBSFN subframe.

Figure 1:
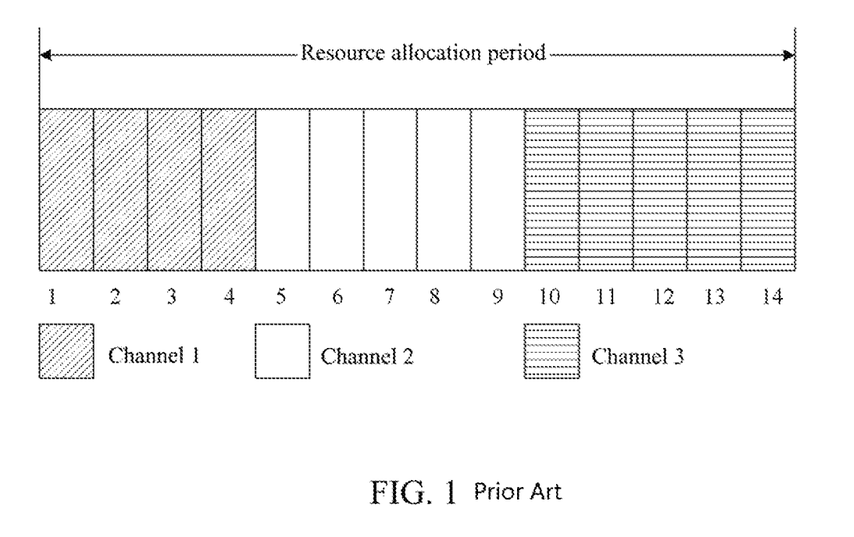
FIG. 1 is an schematic diagram of allocating radio interface channel resources according to the resource allocation period in the related art, wherein ▨ represents the MBSFN subframe resources allocated for the MCH1, □ represents the MBSFN subframe resources allocated for the MCH2, and ☰ represents the MBSFN subframe resources allocated for the MCH3.

In the related art, the base station notifies the UE of the resource allocation information related to the MCH through the MCCH message in the radio interface, and said resource allocation information includes information such as the resource allocation period, the particular location/number of the resources occupied by each MCH and so on. For example, in a method, the resource allocation periods of all the MCHs in the MBSFN area corresponding to this MCCH, the information of all the MBSFN subframes multiplexed by all the MCHs in this MBSFN area, and the MBSFN subframe resources for time division multiplexing in the resource allocation period of different MCHs are indicated in the MCCH message. One particular allocation example is as shown in FIG. 1, and three MCHs are time division multiplexed to one group of MBSFN subframes in one resource allocation period, wherein the MCH1 occupies the subframes with numbers from 1 to 4, the MCH2 occupies the MBSFN subframes with numbers from 5 to 9, and the MCH3 occupies the MBSFN subframes with numbers from 10 to 14. Said MBSFN subframe numbers refer to the unified numbers of the MBSFN subframe shared by all the MCH channels in one MBSFN area in said resource allocation period.

Figure 2:
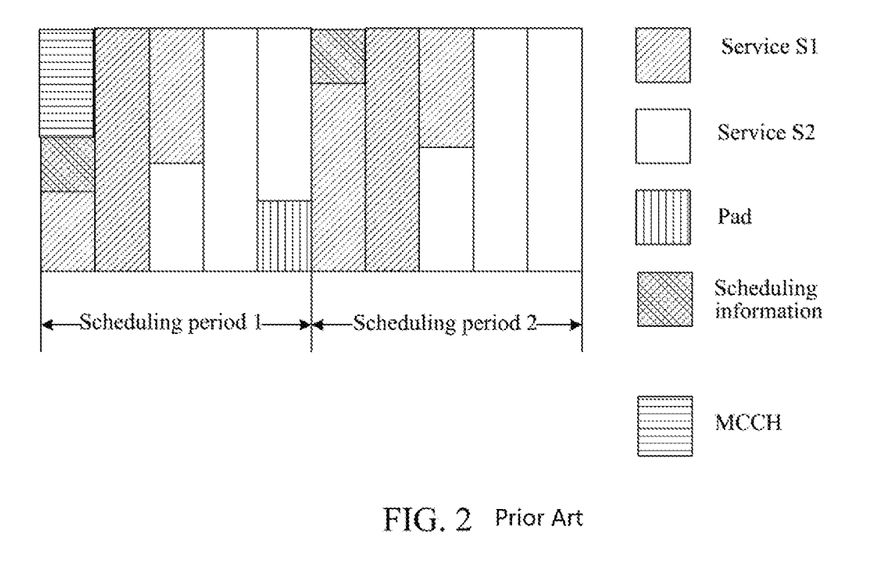
FIG. 2 is a schematic diagram of implementing dynamical multiplexing and scheduling of the MBMS service in the related art, wherein ☰ represents the MBSFN subframe resources allocated for the MCCH, ▨ represents the MBSFN subframe resources occupied by the service S1, □ represents the MBSFN subframe resources occupied by the service S2, ⊞ represents the padded parts, and ▩ represents the MBSFN subframe resources occupied by scheduling information, and this diagram is a schematic diagram of combining the resources used by a plurality of services in the scheduling period.

For the dynamical multiplexing of the MBMS service, the related art also introduces the concept of scheduling period. The scheduling period refers to the time period periodically configured for the radio interface. In one scheduling period, one MTCH or the data of one MBMS service continuously occupy the MBSFN subframe resource of the MCH bearing this MBMS service until all the service data of the service required to be sent in this scheduling period are completely sent. Data for different services might also be sent in the same MBSFN subframe. That is to say, service data of different services may be cascaded together to be sent in the same Media Access Control (MAC) Packet Data Unit (PDU). The above service sending order is notified to the user equipment through the MCCH channel. FIG. 2 shows one example of sending the scheduling information and the data of two services S1 and S2 in dynamical multiplexing in one scheduling period in a MCH, wherein the scheduling information is used for indicating the location information of the MBSFN subframe where the data of each MBMS service born on the MCH channel is located in the scheduling period. The user equipment is only required to receive the service data at its interested particular MBSFN subframe by indicating the location information of the service data to avoid reading the MBSFN subframe bearing other services.

There are following a plurality of particular methods for indicating the scheduling information: 1, the start subframe location of the service; 2 the end subframe location of the service, and at this point, the UE obtaining the start location information of the posterior service by obtaining the end location of the previous service; 3, the number information of the subframes occupied by the service, and at this point, the UE obtaining the start subframe location of one service by accumulating the number of subframes occupied by all the services before said one service in one MCH.

The scheduling information is sent by one of following ways. 1. The scheduling information is sent by being born in the logical channel MSCH, and the MSCH is born in the MCH to send. 2. The scheduling information is sent by being born in the MAC Control Element (CE), and the MAC CE is born in the MCH to send.

In one of existing methods for implementing the synchronization sending of the MBMS service data among a plurality of network elements, one synchronization protocol processing, i.e., Synchronization (SYNC) protocol, is provided. This SYNC protocol comprises following processing.

In step 1, the upper layer network element sends the MBMS service data packet to various lower layer network elements, and this service data packet carries the service data and includes the time stamp information, the data packet serial number information and accumulated service data length information and so on. The upper layer network element identifies one or more continuous service data packets with the same time stamp information, and these data packets identified with the same time stamp composes one data burst, which is also called as the synchronization sequence. The difference of time stamps of two adjacent synchronization sequences is the length of the synchronization sequence, or is called as a SYNC period.

At present, there are two ways for configuring the time stamp information of each data packet, and one is to include the reference time information when the synchronization sequence starts to be sent at the radio interface in each data packet contained in the synchronization sequence, the other is to include the reference time information when the previous synchronization sequence starts to be sent at the radio interface in each data packet included in the synchronization sequence.

At the end of each synchronization sequence, the upper layer network element also sends a kind of the SYNC control frame, which only includes information of the total number of the data packets of the previous synchronization sequence and the total length of the data packets, for use by the lower layer network elements detecting the end of one synchronization sequence and obtaining the total data length and the total number of data packets of one synchronization sequence.

In step 2, for the service data packets in one synchronization sequence, the lower layer network elements send the service data packets in sequence at the radio interface in the scheduling period corresponding to the time stamp carried in the service data packet.

According to the sizes of the SYNC period and the scheduling period, the length of a plurality of synchronization sequences can correspond to one scheduling period, and that is, a plurality of synchronization sequences sent by the upper layer network element are mapped into one scheduling period at the radio interface, and the data of the plurality of synchronization sequences of one service are cascaded by the RLC layer to implement the continuous sending in the scheduling period. Or, the length of one synchronization sequence also can correspond to one or more scheduling periods, and that is, one synchronization sequence sent by the upper layer network element is mapped into resources of one or more continuous scheduling periods at the radio interface to be sent.

The above upper layer network elements can be a Broadcast Multicast Service Center (BMSC), a Gateway GPRS Support Node (GGSN), a Serving GPRS Support Node (SGSN), a multimedia broadcast multicast service gateway namely a Media Gateway (MGW), or other network element entities for implementing functions of the above upper layer network element. The lower layer network element can be a Radio Network Controller (RNC), a NodeB, eNB, or node B+ in the High Speed Packet Access+(HSAP+) network (NB+), or other network element entities for implementing functions of the above lower layer network element.

In the existing synchronization method, network architecture for implementing the multi-network element coordination resource allocation is also provides. In this architecture, a central coordination network element is defined. This network element implements the following functions: coordinating multiple lower layer network elements to allocate the same radio interface resources for the same traffic or transport channel; coordinating the multiple lower layer network elements to implement the synchronously scheduling and sending of the service data; coordinating multiple lower layer network elements to synchronously update MCCH so as to implement the synchronization sending of the MCCH. In the LTE system, the above coordination network element is a Multi-cell/multicast Coordination Entity (MCE), and in the UMTS system, the above coordination network element is a primary RNC.

Figure 3:
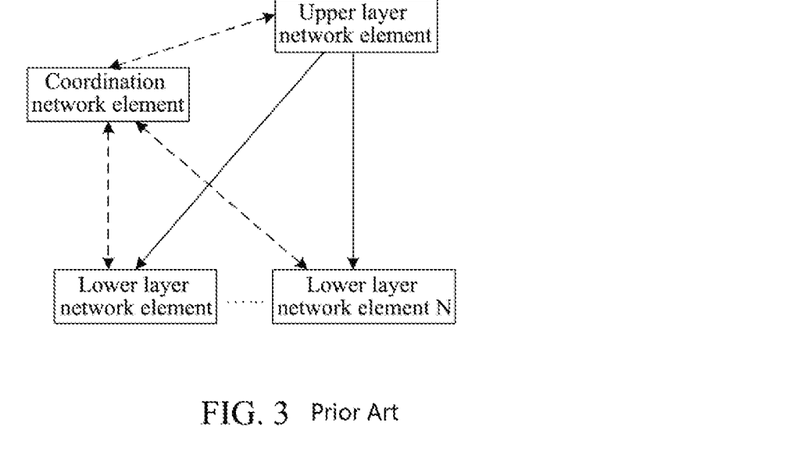
FIG. 3 is a schematic diagram of the network architecture based on which the method according to the example of the invention is.

FIG. 3 shows a relation diagram of the above upper layer network element, the coordination network element and the lower layer network element. The solid line in FIG. 3 is used for representing the transmission of the data packet and the control packet, and the dotted line is used for representing the control signalling connection.

In one existing related art, different services can be configured with different scheduling periods. According to the difference of the quality of service and the service traffic features, the service with a large service speed change is configured with a larger scheduling period so as to obtain the gain of the smooth service traffic. The service with a small service speed change can be configured with a smaller scheduling period so as to shorten the delay of receiving the service by the UE. But for the radio interface resource allocation, i.e., the MBSFN subframe resource configuration of the MCH, multiple different MCHs can be configured with the same resource allocation period so as to achieve the object of simplifying the signalling and reducing the overhead of the signalling.

Considering the consistence of the mapping from the scheduling period to the radio resource allocation period, the scheduling period should be the integral times of the resource allocation period of the MCH. At this point, one scheduling period is represented as the length of multiple continuous resource allocation periods at the radio interface. The service data that is required to be sent in the scheduling period is sent on the radio resource allocated in the multiple resource allocation periods.

SUMMARY OF THE INVENTION

The related art does not considers the requirements how does the UE acquire the different scheduling periods of different services and obtain the scheduling information of the MCH channel bearing this service when different scheduling periods are configured to different services. UE cannot obtain the accurate scheduling period information or the sending period of the scheduling information according to the resource configuration information in the related art. Besides, when the scheduling period and the resource allocation period are inconsistent, the meaning of the MBSFN subframe number indicated by the scheduling information should be determined for the purpose of indicating the location information of the service data in one scheduling period. The lack of the above information will cause that the UE cannot accurately receive or analyze the content of the scheduling information, which affects the efficiency of the UE receiving the service and cannot achieve the object of saving power.

The technical problem to be solved in the present invention is to provide a method for scheduling and transmitting a multimedia broadcast multicast service and a corresponding system thereof, which enable the UE to accurately receive the scheduling information in the case that the scheduling period and the resource allocation period are inconsistent.

In order to solve the above problem, the present invention provides a method for scheduling and transmitting a Multimedia Broadcast Multicast Service (MBMS), comprising:

for each multicast radio interface channel, a lower layer network element scheduling a MBMS born by the multicast radio interface channel according to a scheduling period of the multicast radio interface channel, wherein data of the MBMS are scheduled and scheduling information is generated in a Multicast/Broadcast over Single Frequency Network (MBSFN) subframe resource occupied by the multicast radio interface channel in a resource allocation period corresponding to the scheduling period; and said lower layer network element sending to a user equipment a signaling indicating resource allocation information and scheduling period information of each multicast radio interface channel, and sending the data of the MBMS and said scheduling information to the user equipment.

Said multicast radio interface channel is a Multicast Channel (MCH) or a Physical Multicast Channel (PMCH) in a Long Term Evolution (LTE) system, said lower layer network element is a evolved Node B (eNB), and the resource allocation information and the scheduling period information of said multicast radio interface channel are sent on a Multicast Control Channel.

A length of the scheduling period of said each multicast radio interface channel is integer times of a length of the resource allocation period of the multicast radio interface channel, and a border of this scheduling period aligns at a border of this resource allocation period, and one scheduling period of the multicast radio interface channel corresponds to one or more said resource allocation periods in a same time period.

The data of said MBMS are synchronously sent at all base stations in a same MBSFN area by way of synchronization sequence; for each synchronization sequence of said MBMS, said base station schedules the synchronization sequence in the scheduling period corresponding to a time stamp of the synchronization sequence;

a length of the scheduling period of each said multicast radio interface channel is integer times of a length of the synchronization sequence of all the MBMS born on the multicast radio interface channel, and the scheduling period of said MBMS is the scheduling period of the multicast radio interface channel bearing said MBMS.

The scheduling period of said each multicast radio interface channel is determined by one of following ways:

in a first way, an upper layer network element indicating the length of the synchronization sequence of the MBMS to the lower layer network element, and said lower layer network element determining the scheduling period of said multicast radio interface channel according to the length of said synchronization sequence and the resource allocation period of the multicast radio interface channel bearing said MBMS; or in a second way, the upper layer network element indicating the length of the synchronization sequence of the MBMS to a coordination network element, and said coordination network element determining the scheduling period of said multicast radio interface channel according to the length of said synchronization sequence and the resource allocation period of the multicast radio interface channel bearing said MBMS, and notifying the lower layer network element; or in a third way, the upper layer network element determining the scheduling period of said multicast radio interface channel according to the length of said synchronization sequence of the MBMS and the resource allocation period of the multicast radio interface channel bearing said MBMS, and notifying the lower layer network element, or notifying the coordination network element and then the coordination network element notifying the lower layer network element; wherein said upper layer network element is a Broadcast Multicast Service Center (BMSC), a Gateway GPRS Support Node (GGSN), a Serving GPRS Support Node (SGSN), or a Media Gateway (MGW), said lower layer network element is a Radio Network Controller (RNC), or a base station, and said coordination network element is a Multi-cell/multicast Coordination Entity (MCE) or a primary RNC. Before the step of the lower layer network element sending the signaling to the user equipment, the method further comprises:

said lower layer network element generating one piece of scheduling information for each scheduling period of each multicast radio interface channel and sending the scheduling information once at least, wherein sending times of the scheduling information and location information of the occupied MBSFN subframe are notified by said lower layer network element to said user equipment or are pre-promised by said lower layer network element and the user equipment, and said location information includes a relative location of the MBSFN subframe occupied by said scheduling information and the MBSFN subframe occupied by the multicast radio interface channel in the scheduling period;

said lower layer network element is a Radio Network Controller (RNC) or a base station.

The method further comprises:

the user equipment acquiring the MBSFN subframe occupied by the multicast radio interface channel where the MBMS to be received is located in one scheduling period according to the scheduling information and the resource allocation information of the multicast radio interface channel in the received signaling, determining a sending location of the scheduling information of this multicast radio interface channel combining a notification or pre-promise of said lower layer network element, receiving said scheduling information on this sending location, and further receiving the data of said MBMS to be received according to an indication of said scheduling information.

The location information of the data of each MBMS in said scheduling information is represented by a number of a first or a last MBSFN subframe occupied by the data of the MBMS in the scheduling period, or a number of occupied MBSFN subframes in this scheduling period, and numbers of said MBSFN subframes are obtained by uniformly numbering all the MBSFN subframes occupied by this multicast radio interface channel in each scheduling period independently.

The method further comprises:

after acquiring the MBSFN subframe occupied by the multicast radio interface channel where the MBMS to be received is located in one scheduling period, the user equipment uniformly numbering all the MBSFN subframes occupied by the multicast radio interface channel in the scheduling period according to a same way to determine the MBSFN subframe where the data of said MBMS to be received in said scheduling information is located.

In order to solve the above problem, the present invention further provides a system for scheduling and transmitting a Multimedia Broadcast Multicast Service (MBMS), comprising a lower layer network element and a user equipment, wherein:

said lower layer network element is configured to: for each multicast radio interface channel, schedule a MBMS born by the multicast radio interface channel according to a scheduling period of the multicast radio interface channel, schedule data of the MBMS and generate scheduling information in a Multicast/Broadcast over Single Frequency Network (MBSFN) subframe resource occupied by the multicast radio interface channel in a resource allocation period corresponding to the scheduling period, indicate resource allocation information and scheduling period information of each multicast radio interface channel in signaling sent to the user equipment, and send the data of the MBMS and said scheduling information to the user equipment;

said user equipment is configured to: acquire a MBSFN subframe occupied by the multicast radio interface channel where the MBMS to be received is located in one scheduling period according to the scheduling information and the resource allocation information of the multicast radio interface channel in the received signaling, receive said scheduling information on a sending location of the scheduling information of the located multicast radio interface channel, and further receive the data of said MBMS to be received according to an indication of said scheduling information.

Said lower layer network element is an evolved Node B (eNB) in a Long Term Evolution (LTE) system, said multicast radio interface channel is a Multicast Channel (MCH) or a Physical Multicast Channel (PMCH), and said lower layer network element schedules the MBMS born by the MCH in the scheduling period of the MCH or by the PMCH in the scheduling period of the PMCH, and sends the resource allocation information and the scheduling period information of said multicast radio interface channel on a Multicast Control Channel (MCCH);

a length of the lower layer network element based scheduling period of each multicast radio interface channel is integer times of a length of the resource allocation period of the multicast radio interface channel, and a border of the scheduling period aligns at a border of the resource allocation period, and one scheduling period corresponds to one or more said resource allocation periods in a same time period, and a length of the scheduling period of said each multicast radio interface channel is integer times of a length of a synchronization sequence of all the MBMS born on the multicast radio interface channel, and said eNB schedules the synchronization sequence in the scheduling period corresponding to a time stamp of each synchronization sequence of the MBMS.

Said lower layer network element is further configured to: generate one piece of scheduling information for each scheduling period of each multicast radio interface channel and send the scheduling information once at least, wherein sending times of the scheduling information and location information of the occupied MBSFN subframe are notified by said lower layer network element to said user equipment or are pre-promised by said lower layer network element and the user equipment, and said location information includes a relative location of the MBSFN subframe occupied by said scheduling information and the MBSFN subframe occupied by the multicast radio interface channel in the scheduling period;

said user equipment is further configured to: acquire the MBSFN subframe occupied by the multicast radio interface channel where the MBMS to be received is located in one scheduling period, and then determine a sending location of the scheduling information of the multicast radio interface channel combining a notification or a pre-promise of said lower layer network element;

said lower layer network element is a Multi-cell/multicast Coordination Entity (MCE) or a primary RNC.

The location information of the data of each MBMS in said scheduling information generated by said lower layer network element is represented by a number of a first or a last MBSFN subframe occupied by the data of the MBMS in the scheduling period, or by a number of occupied MBSFN subframes in the scheduling period, and numbers of said MBSFN subframes are obtained by uniformly numbering all the MBSFN subframes occupied by the multicast radio interface channel in each scheduling period independently;

said user equipment is further configured to: uniformly number all the MBSFN subframes occupied by the multicast radio interface channel in the scheduling period according to a same way after acquiring the MBSFN subframe occupied by the multicast radio interface channel where the MBMS to be received is located in one scheduling period to determine the MBSFN subframe where the data of said MBMS to be received in said scheduling information is located.

In order to solve the above problem, the present invention further provides a lower layer network element for supporting scheduling and transmitting a Multimedia Broadcast Multicast Service (MBMS), configured to:

for each multicast radio interface channel, schedule a MBMS born by the multicast radio interface channel according to a scheduling period of the multicast radio interface channel, schedule data of the MBMS and generate scheduling information in a Multicast/Broadcast over Single Frequency Network (MBSFN) subframe resource occupied by the multicast radio interface channel in a resource allocation period corresponding to the scheduling period, indicate resource allocation information and scheduling period information of each multicast radio interface channel in signaling sent to the user equipment, and send the data of the MBMS and said scheduling information to the user equipment, so that said user equipment acquires a MBSFN subframe occupied by the multicast radio interface channel where the MBMS to be received is located in one scheduling period according to the scheduling information and the resource allocation information of the multicast radio interface channel in the received signaling, receives said scheduling information on a sending location of the scheduling information of the located multicast radio interface channel, and further receives the data of said MBMS to be received according to an indication of said scheduling information.

The lower layer network element is further configured to: generate one piece of scheduling information for each scheduling period of each multicast radio interface channel and send the scheduling information once at least, wherein sending times of the scheduling information and location information of the occupied MBSFN subframe are notified by said lower layer network element to said user equipment or are pre-promised by said lower layer network element and the user equipment, and said location information includes the MBSFN subframe occupied by said scheduling information and a relative location of the MBSFN subframe occupied by this multicast radio interface channel in the scheduling period, so that said user equipment acquires the MBSFN subframe occupied by the multicast radio interface channel where the MBMS to be received is located in one scheduling period, and then determine a sending location of the scheduling information of the multicast radio interface channel combining a notification or a pre-promise of said lower layer network element;

said lower layer network element is a Multi-cell/multicast Coordination Entity (MCE) or a primary RNC.

In the above implementation scheme, UE is notified of the scheduling period and the resource allocation information by determining the scheduling period of the multicast radio interface channel and mapping to the corresponding resource allocation period, to enable the UE to accurately receive the scheduling information in the case that the scheduling period and the resource allocation period are inconsistent. In one example, the network side uses the subframe number obtained by uniformly numbering all the MBSFN subframes occupied by the multicast radio interface channel in one scheduling period to represent the location of the service data in the scheduling information, and thus the terminal can also performs numbering according to the same way to determine the MBSFN subframe where the service data is located, thereby being able to accurately analyze out the scheduling information.

PREFERRED EMBODIMENTS OF THE PRESENT INVENTION

Below the particular examples of the present invention will be described in detail with reference to the figures.

This example takes the LTE system for instance. The upper layer network element is a Broadcast Multicast Service Center (BMSC). The coordination network element is a MCE. The lower layer network element is a base station network element eNB. The radio interface channel is the MCH. In another example, the radio interface channel also can be the PMCH.

The BMSC indicates the control information, such as the start and end of one or more MBMS, the MCH bearing the service and so on, to the MCE through the control plane message. In this example, the BMSC also indicates the length L of the synchronization sequence of one MBMS service to the MCE. Particularly, the MBMS session start message can include the indicated length L of the synchronization sequence of the service.

The MCE determines the resource allocation period T of the MCH bearing said service (the service in this text refers to the MBMS), and the scheduling period P of the MCH is the integer times of the resource allocation period T and the length L of the synchronization sequence of the born service. When the MCH bears a plurality of services, the length of the scheduling period P of the MCH is the integer times of the length of the synchronization sequence of each service, and the scheduling period of the service is equal to the scheduling period of the MCH bearing this service. In one example, the BMSC configure that the length of the synchronization sequence of the service is 160 ms, and the MCE configures that the scheduling period of the MCH1 bearing this service is 640 ms and the resource allocation period of the MCH1 is 320 ms. Then each 4 synchronization sequences of the service will be mapped into one scheduling period of the MCH1 to be sent, and each scheduling period is mapped into two resource allocation periods.

The MCE sends the control plane message to the eNB that is required to send the MBMS to indicate the scheduling period P of the MCH1. If the scheduling period is different from the length of the synchronization sequence, then the length information L of the synchronization sequence of the service can also be indicated.

The eNB allocates the MBSFN subframe resources of the MCH1 at the radio interface. Particularly, in the 320 ms resource allocation period, resources are allocated for the MCH1 as follows: periodically dividing the radio frame to be sent into a plurality of sections according to the length of 320 ms, such as, taking the radio frames with the System Frame Numbers (SFNs) from 0 to 31 as one resource allocation period, taking the radio frames with SFN from 32 to 63 as the next resource allocation period, and so on, each 32 radio frames are one resource allocation period. The eNB allocates the MBSFN subframe resources for the MCH in each resource allocation period.

The eNB determines the mapping from the scheduling period to the resource allocation period according to the relationship between the scheduling period and the resource allocation period. In this example, the scheduling period is 640 ms, including the length of two resource allocation periods. It can be the 64 radio frames with the SFN from 0 to 63 as one scheduling period, and the 64 radio frames with the SFN from 64 to 127 are the next scheduling period, and so on. Then, the service data that is required to send in one scheduling period are mapped to the channel resources of two resource allocation periods in the same time period to be sent.

The eNB maps the synchronization sequence sent by the BMSC to the scheduling period corresponding to its time stamp according to the SYNC protocol. Based on the definition of the SYNC protocol, the time stamp of the synchronization sequence indicates the sending time of the data packets of this synchronization sequence at the radio interface. The scheduling period exactly corresponding to this sending time (i.e., this sending time is the start time of this scheduling period) or one scheduling period after this sending time is the scheduling period corresponding to the time stamp of this synchronization sequence.

The eNB uniformly numbers all the MBSFN subframes occupied by the MCH1 in one scheduling period, and the MBSFN subframes are independently numbered in each scheduling period. In this example, all the MBSFN subframes allocated by the MCH1 in two resource allocation period corresponding to 640 ms scheduling period are uniformly numbered. In one resource allocation period, the number of the MBSFN subframes occupied by the MCH1 is 3, and then in one scheduling period, the number of the MBSFN subframes occupied by the MCH1 is 6. The eNB uniformly numbers the 6 MBSFN subframes occupied by the MCH1 in each scheduling period, for example, the subframes are numbered as 1~6.

When the eNB schedules the service data to one or more MBSFN subframs allocated for the MCH1, the numbers of the MBSFN subframes allocated for the MCH1 are used to represent the location information of the service data of each service born on this MCH1 in the scheduling information. The scheduling information of the MCH1 can be the number (or called as the Index) of the first MBSFN subframe or the last MBSFN subframe in the MCH1 occupied by the service data of each service born by the MCH1, or the number of subframes in the MCH1 occupied by the service data of each service.

If the scheduling information indicates the number of the first MBSFN subframe number or the last MBSFN subframe number occupied by the service data in the MCH1, then the number is the number of the MBSFN subframe in the MBSFN subframe set occupied by this MCH1 in one scheduling period. If the scheduling information indicates the number of the MBSFN subframes occupied by the service data in the MCH1, then for one service born by this MCH1, UE determines the location of the first MBSFN subframe occupied by this service data, that is, the number of the first MBSFN subframe in the MBSFN subframe set occupied by this MCH1 in one scheduling period, by accumulating the number of subframes in this scheduling period occupied by all the service before this service in the MCH1.

The eNB indicates the resource allocation information and the scheduling period information of the MCH1 to the UE through the MCCH channel message. The scheduling period information can be represented by the times of the resource allocation period or the number of radio frames or a particular time value taking the microsecond or the second as a unit, wherein the resource allocation information includes: the resource allocation period information and the MBSFN subframe information occupied by the MCH1 in the resource allocation period. The scheduling period information includes the scheduling period length, which can take the number of radio frames (the length is 10 ms) as a unit, or take the times of the scheduling period as a unit. In this example, the scheduling period can be configured as 64 radio frames, or 640 ms, or 2 resource allocation periods (the resource allocation period=320 ms), all representing the same time length. In other examples, the corresponding lower layer network elements, for example the node B and the primary RNC, also can send the resource allocation information and scheduling period information through the system message or the dedicated signaling message to the UE.

In the radio interface, the border of the scheduling period aligns at the resource allocation period, for example the start of the scheduling period can be calculated based on the formula: SFN modulo P=0, wherein P is the length of the scheduling period taking the number of the SFN as the unit; the resource allocation period is calculated based on the formula: SFN modulo Pz=0, wherein Pz is the length of the resource allocation period taking the number of the SFN as the unit. The SFN in the formulas represents the radio frame number of the radio frame.

For each scheduling period of each MCH, the eNB sends once scheduling information at least, and the sending way refers to the introduction in the Background of the Related Art. The sending times of the scheduling information and the location of the MBSFN subframe for sending the scheduling information can be implicitly pre-promised between the eNB and the UE or be notified by the eNB to the UE. Based on different techniques, the particular location of the scheduling information can be sent on one or more MBSFN subframes before the first MBSFN subframe of this MCH1 channel in each scheduling period, or can be sent on the first MBSFN subframe, that can be used for sending the scheduling information, of this MCH channel in each scheduling period, and said first MBSFN subframe that can be used for sending the scheduling information can be the first MBSFN subframe or the second or the MBSFN subframe after the second MBSFN subframe (the MBSFN subframe before it has been used for sending other control information, for example for sending the information on the MCCH). In this example, the scheduling information starts to be sent at the first MBSFN subframe, that can be used for sending the scheduling information, of the MCH1 channel in each scheduling period.

In this example, the scheduling information indicates the start location information of the service data of the MBMS service. The start location information is represented by the number of the MBSFN subframe determined by the above method. As the allocation situation shown in FIG. 4, the number of the MBSFN subframe stating to send the service S1 in the first scheduling period is 5, and the number of the MBSFN subframe stating to send the service S1 in the second scheduling period is 6.

For the MCH channel bearing the service to be received, assuming as the MCH1, the UE acquires the MBSFN subframe occupied by this MCH1 in each resource allocation period according to the resource allocation information of the MCH1 indicated by the MCCH, and acquires the sending period of the scheduling information according to the scheduling period information of the MCH1 indicated by the MCCH, and can acquire the MBSFN subframe occupied by the MCH1 in one scheduling period in combination with the resource allocation information and the scheduling period information, and can calculate numbers of various MBSFN subframe allocated for the MCh1 in one scheduling period.

The UE receives the scheduling information of this scheduling period according to the sending period of the scheduling information, and acquires the location information of the service to be received in the scheduling period corresponding to the scheduling information based on the scheduling information.

Figure 4:
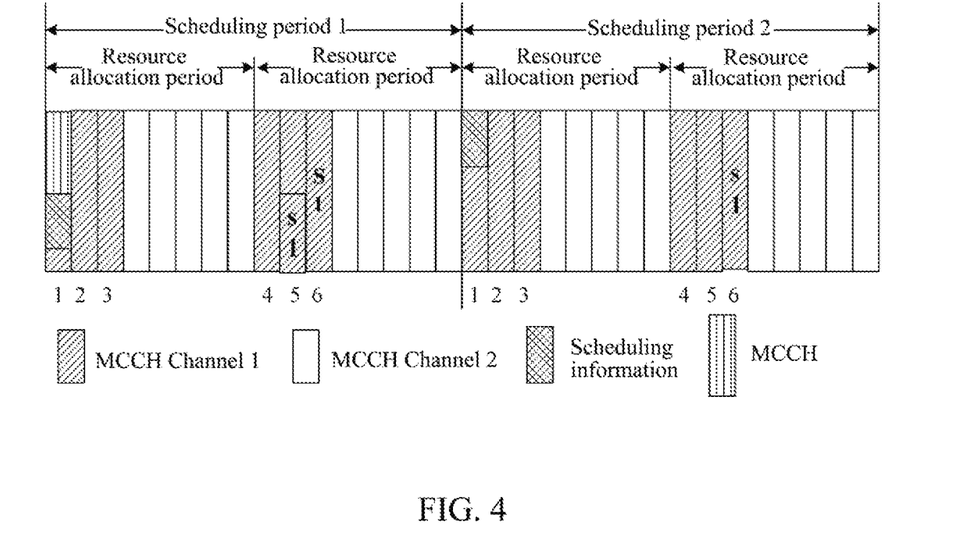
FIG. 4 is a schematic diagram of allocating resources for the MCH1 and the MCH2 and allocating resources on the MCH1 for the service S1 in the two scheduling periods according to the example of the present invention, wherein ⊞ represents the MBSFN subframe resources occupied by the MCCH, ▩ represents the MBSFN subframe resources occupied by the scheduling information, ▨ represents the MBSFN subframe resources occupied by the MCH1, and □ represents the MBSFN subframe resources occupied by the MCH2.

In this example, the MBSFN subframe resources occupied by the MCH1 in one resource allocation period can be acquired by the UE according to the resource allocation information are the 3 MBSFN subframes shown in FIG. 4. According to the length of the scheduling period, it can be obtained that one scheduling period includes two resource allocation periods, and then the location and number (6) of the subframes occupied by the MCH1 in one scheduling period can be obtained. The UE starts to receive the scheduling information at the first MBSFN subframe which can be used for sending the scheduling information of the MCH1 in each scheduling period. According to the indication of the scheduling information, the data of service S1 starts to be received at the MBSFN subframe with a number of 5 in the MCH in the scheduling period 1, and the data of service S1 starts to be received at the MBSFN subframe with a number of 6 in the MCH in the scheduling period 2.

This example further provides a lower layer network element for supporting the scheduling and transmission of the MBMS, configured to:

for each multicast radio interface channel, schedule the MBMS service born by this multicast radio interface channel according to the scheduling period of this multicast radio interface channel, schedule the data of the MBMS and generate the scheduling information in the MBSFN subframe resource occupied by this multicast radio interface channel in the resource allocation period corresponding to this scheduling period, and indicate the resource allocation information and scheduling period information of each multicast radio interface channel in the signaling sent to the user equipment, and send the data and scheduling information of the MBMS to the user equipment, so as to make the user equipment acquire the MBSFN subframe occupied by the multicast radio interface channel where the MBMS to be received is located in one scheduling period according to the scheduling information and resource allocation information of the multicast radio interface channel n the received signaling, to receive the scheduling information at the sending location of the scheduling information of the located multicast radio interface channel, further to receive the data of the MBMS to be received according to the indication of the scheduling information.

The lower layer network element is further configured to:

generate and at least send once one piece of scheduling information for each scheduling period of each multicast radio interface channel, the sending times of the scheduling information and the location information of the occupied MBSFN subframe are notified by the lower layer network element to the user equipment or are pre-promised between the lower layer network element and the user equipment, and the location information includes the MBSFN subframe occupied by scheduling information and a relative location of the MBSFN subframe occupied by this multicast radio interface channel in each scheduling period, so as to make the user equipment determine the sending location of the scheduling information of the multicast radio interface channel in combination with the notification or the pre-promise of the lower layer network element after acquiring the MBSFN subframe occupied by the multicast radio interface channel where the MBMS to be received is located in one scheduling period;

the lower layer network element is a MCE or a primary RNC.

The person having ordinary skill in the art could understand that all or parts of steps in the above method examples can be implemented by the program commanding related hardware, and said programs can be stored in one computer readable memory medium, such as the Read-Only Memory (ROM), magnetic disk, or optical disk and so on. Optionally, all or parts of steps in the above examples can use one or more integrated circuits to be implemented. Accordingly, each module/unit in the above examples can adopt the form of the hardware to be implemented, and also can adopt the form of the software to be implemented. The present invention is not limited to any specified form combination of the hardware and software.

INDUSTRIAL APPLICABILITY

In the present invention, UE is notified of the scheduling period and the resource allocation information by determining the scheduling period of the multicast radio interface channel and mapping to the corresponding resource allocation period, to enable the UE to accurately receive the scheduling information in the case that the scheduling period and the resource allocation period are inconsistent. In addition, the present invention also can accurately analyze out the scheduling information.

What is claimed is:

1. A method for scheduling and transmitting a Multimedia Broadcast Multicast Service (MBMS), comprising:

for each multicast radio interface channel, a lower layer network element scheduling data of the MBMS and generating scheduling information on multiple Multicast/Broadcast over Single Frequency Network (MBSFN) subframes occupied by the multicast radio interface channel in multiple resource allocation periods corresponding to a scheduling period of the multicast radio interface channel, wherein the scheduling period is used for dynamical multiplexing of the MBMS and one scheduling period corresponds to multiple resource allocation periods in a same time period, location information of the data of each MBMS in said scheduling information is represented by a number of a first or a last MBSFN subframe occupied by the data of the MBMS in the scheduling period, or by a number of occupied MBSFN subframes in the scheduling period, wherein numbers of the MBSFN subframes are obtained by sequentially numbering with consecutive integers all the MBSFN subframes of the multiple resource allocation periods occupied by the multicast radio interface channel in each scheduling period independently, and said lower layer network element sending a signaling to a user equipment, wherein the signaling indicates resource allocation information and scheduling period information of each multicast radio interface channel, and sending the data of the MBMS and said scheduling information to the user equipment.

2. The method of claim 1, wherein said multicast radio interface channel is a Multicast Channel (MCH) or a Physical Multicast Channel (PMCH) in a Long Term Evolution (LTE) system, said lower layer network element is an evolved Node B (eNB), and the resource allocation information and the scheduling period information of said multicast radio interface channel are sent on a Multicast Control Channel (MCCH).

3. The method of claim 1, wherein a length of the scheduling period of said each multicast radio interface channel is integer times of a length of the resource allocation period of the multicast radio interface channel, and a border of the scheduling period aligns at a border of the resource allocation period.

4. The method of claim 1, wherein the data of said MBMS are synchronously sent at all base stations in a same MBSFN area by way of synchronization sequence; for each synchronization sequence of said MBMS, said base station schedules the synchronization sequence in the scheduling period corresponding to a time stamp of the synchronization sequence;

a length of the scheduling period of each said multicast radio interface channel is integer times of a length of the synchronization sequence of all the MBMS born on the multicast radio interface channel, and the scheduling period of said MBMS is the scheduling period of the multicast radio interface channel bearing said MBMS.

5. The method of claim 4, wherein the scheduling period of said each multicast radio interface channel is determined by one of following ways:

in a first way, an upper layer network element indicating the length of the synchronization sequence of the MBMS to the lower layer network element, and said lower layer network element determining the scheduling period of said multicast radio interface channel according to the length of said synchronization sequence and the resource allocation period of the multicast radio interface channel bearing said MBMS; or in a second way, the upper layer network element indicating the length of the synchronization sequence of the MBMS to a coordination network element, and said coordination network element determining the scheduling period of said multicast radio interface channel according to the length of said synchronization sequence and the resource allocation period of the multicast radio interface channel bearing said MBMS, and notifying the lower layer network element; or in a third way, the upper layer network element determining the scheduling period of said multicast radio interface channel according to the length of said synchronization sequence of the MBMS and the resource allocation period of the multicast radio interface channel bearing said MBMS, and notifying the lower layer network element, or notifying the coordination network element and then the coordination network element notifying the lower layer network element; wherein said upper layer network element is a Broadcast Multicast Service Center (BMSC), a Gateway GPRS Support Node (GGSN), a Serving GPRS Support Node (SGSN), or a Media Gateway (MGW), said lower layer network element is a Radio Network Controller (RNC), or a base station, and said coordination network element is a Multi-cell/multicast Coordination Entity (MCE) or a primary RNC.

6. The method of claim 1, wherein, before the step of the lower layer network element sending the signaling to the user equipment, the method further comprises:

said lower layer network element generating one piece of scheduling information for each scheduling period of each multicast radio interface channel and sending the scheduling information once at least, wherein sending times of the scheduling information and location information of the occupied MBSFN subframe are notified by said lower layer network element to said user equipment or are pre-promised by said lower layer network element and the user equipment, and said location information includes a relative location of the MBSFN subframe occupied by said scheduling information and the MBSFN subframe occupied by the multicast radio interface channel in the scheduling period;

said lower layer network element is a Radio Network Controller (RNC) or a base station.

7. The method of claim 6, wherein, the method further comprises:

the user equipment acquiring the MBSFN subframe occupied by the multicast radio interface channel where the MBMS to be received is located in one scheduling period according to the scheduling information and the resource allocation information of the multicast radio interface channel in the received signaling, determining a sending location of the scheduling information of the multicast radio interface channel combining a notification or pre-promise of said lower layer network element, receiving said scheduling information on the sending location, and further receiving the data of said MBMS to be received according to an indication of said scheduling information.

8. The method of claim 7, wherein, the method further comprises:

after being notified of the MBSFN subframe occupied by the multicast radio interface channel where the MBMS to be received is located in the scheduling period, the user equipment consecutively numbering all the MBSFN subframes occupied by the multicast radio interface channel in the scheduling period in the same way as the lower layer network element to determine the MBSFN subframe where the data of said MBMS to be received is located according to said scheduling information.

9. A system for scheduling and transmitting a Multimedia Broadcast Multicast Service (MBMS), comprising a lower layer network element and a user equipment, wherein:

said lower layer network element is configured to: for each multicast radio interface channel, schedule data of the MBMS and generate scheduling information on multiple Multicast/Broadcast over Single Frequency Network (MBSFN) subframes occupied by the multicast radio interface channel in multiple resource allocation periods corresponding to a scheduling period of the multicast radio interface channel, wherein the scheduling period is used for dynamical multiplexing of the MBMS and one scheduling period corresponds to multiple resource allocation periods in a same time period, location information of the data of each MBMS in said scheduling information is represented by a number of a first or a last MBSFN subframe occupied by the data of the MBMS in the scheduling period, or by a number of occupied MBSFN subframes in the scheduling period, wherein numbers of the MBSFN subframes are obtained by sequentially numbering with consecutive integers all the MBSFN subframes of the multiple resource allocation periods occupied by the multicast radio interface channel in each scheduling period independently;

indicate resource allocation information and scheduling period information of each multicast radio interface channel in signaling sent to the user equipment, and send the data of the MBMS and said scheduling information to the user equipment;

said user equipment is configured to: acquire a MBSFN subframe occupied by the multicast radio interface channel where the MBMS to be received is located in the scheduling period according to the scheduling information and the resource allocation information of the multicast radio interface channel in a received signaling, receive said scheduling information on a sending location of the scheduling information of the located multicast radio interface channel, and further receive the data of said MBMS to be received according to an indication of said scheduling information.

10. The system of claim 9, wherein said lower layer network element is an evolved Node B (eNB) in a Long Term Evolution (LTE) system, said multicast radio interface channel is a Multicast Channel (MCH) or a Physical Multicast Channel (PMCH), and said lower layer network element schedules the MBMS born by the MCH in the scheduling period of the MCH or by the PMCH in the scheduling period of the PMCH, and sends the resource allocation information and the scheduling period information of said multicast radio interface channel on a Multicast Control Channel (MCCH);

a length of the lower layer network element based scheduling period of each multicast radio interface channel is integer times of a length of the resource allocation period of the multicast radio interface channel, and a border of the scheduling period aligns at a border of the resource allocation period, and one scheduling period corresponds to one or more said resource allocation periods in a same time period, and a length of the scheduling period of said each multicast radio interface channel is integer times of a length of a synchronization sequence of all the MBMS born on the multicast radio interface channel, and said eNB schedules the synchronization sequence in the scheduling period corresponding to a time stamp of each synchronization sequence of the MBMS.

11. The system of claim 9, wherein
said lower layer network element is further configured to:
generate one piece of scheduling information for each scheduling period of each multicast radio interface channel and send the scheduling information once at least, wherein sending times of the scheduling information and location information of the occupied MBSFN subframe are notified by said lower layer network element to said user equipment or are pre-promised by said lower layer network element and the user equipment, and said location information includes a relative location of the MBSFN subframe occupied by said scheduling information and the MBSFN subframe occupied by the multicast radio interface channel in the scheduling period;
said user equipment is further configured to: acquire the MBSFN subframe occupied by the multicast radio interface channel where the MBMS to be received is located in one scheduling period, and then determine a sending location of the scheduling information of the multicast radio interface channel combining a notification or a pre-promise of said lower layer network element;
said lower layer network element is a Multi-cell/multicast Coordination Entity (MCE) or a primary RNC.

12. The system of claim 11, wherein
the location information of the data of each MBMS in said scheduling information generated by said lower layer network element is represented by a number of a first or a last MBSFN subframe occupied by the data of the MBMS in the scheduling period, or by a number of occupied MBSFN subframes in the scheduling period, and numbers of said MBSFN subframes are obtained by consecutively numbering all the MBSFN subframes occupied by the multicast radio interface channel in each scheduling period irrespectively;
said user equipment is further configured to: number all the MBSFN subframes occupied by the multicast radio interface channel in the scheduling period in the same way as the lower layer network element after being notified of the MBSFN subframe occupied by the multicast radio interface channel where the MBMS to be received is located in the scheduling period to determine the MBSFN subframe where the data of said MBMS to be received is located according to said scheduling information.

13. A lower layer network element for supporting scheduling and transmitting a Multimedia Broadcast Multicast Service (MBMS), configured to:
for each multicast radio interface channel, schedule data of the MBMS and generate scheduling information on multiple Multicast/Broadcast over Single Frequency Network (MBSFN) subframes occupied by the multicast radio interface channel in multiple resource allocation periods corresponding to a scheduling period of the multicast radio interface channel, wherein the scheduling period is used for dynamical multiplexing of the MBMS and one scheduling period corresponds to multiple resource allocation periods in a same time period, location information of the data of each MBMS in said scheduling information is represented by a number of a first or a last MBSFN subframe occupied by the data of the MBMS in the scheduling period, or by a number of occupied MBSFN subframes in the scheduling period, wherein numbers of the MBSFN subframes are obtained by sequentially numbering with consecutive integers all the MBSFN subframes of the multiple resource allocation periods occupied by the multicast radio interface channel in each scheduling period independently;
indicate resource allocation information and scheduling period information of each multicast radio interface channel in a signaling sent to a user equipment, and send the data of the MBMS and said scheduling information to the user equipment, so that said user equipment acquires a MBSFN subframe occupied by the multicast radio interface channel where the MBMS to be received is located in the scheduling period according to the scheduling information and the resource allocation information of the multicast radio interface channel in a received signaling, receives said scheduling information on a sending location of the scheduling information of the located multicast radio interface channel, and further receives the data of said MBMS to be received according to an indication of said scheduling information.

14. The lower layer network element of claim 13, wherein, the lower layer network element is further configured to:
generate one piece of scheduling information for each scheduling period of each multicast radio interface channel and send the scheduling information once at least, wherein sending times of the scheduling information and location information of the occupied MBSFN subframe are notified by said lower layer network element to said user equipment or are pre-promised by said lower layer network element and the user equipment, and said location information includes the MBSFN subframe occupied by said scheduling information and a relative location of the MBSFN subframe occupied by the multicast radio interface channel in the scheduling period,
so that said user equipment acquires the MBSFN subframe occupied by the multicast radio interface channel where the MBMS to be received is located in the scheduling period, and then determine a sending location of the scheduling information of the multicast radio interface channel combining a notification or a pre-promise of said lower layer network element;
said lower layer network element is a Multi-cell/multicast Coordination Entity (MCE) or a primary RNC.

* * * * *